United States Patent [19]

Adachi

[11] Patent Number: 5,103,128
[45] Date of Patent: Apr. 7, 1992

[54] ULTRASONIC MOTOR

[75] Inventor: Yoshihiro Adachi, Hamakita, Japan

[73] Assignee: Asmo Co., Ltd., Japan

[21] Appl. No.: 669,682

[22] Filed: Mar. 14, 1991

[30] Foreign Application Priority Data

May 25, 1990 [JP] Japan ................... 2-135554

[51] Int. Cl.5 .......................................... H01L 41/08
[52] U.S. Cl. .................................. 310/323; 310/328
[58] Field of Search ............................. 310/323, 328

[56] References Cited

U.S. PATENT DOCUMENTS

| | | | |
|---|---|---|---|
| 4,560,263 | 12/1985 | Katsuma et al. | 310/323 X |
| 4,723,086 | 2/1988 | Leibovich et al. | 310/328 |
| 4,734,610 | 3/1988 | Okumura et al. | 310/323 |
| 4,787,262 | 11/1988 | Kowaza et al. | 310/328 X |
| 4,793,689 | 12/1988 | Aoyagi et al. | 310/323 X |
| 4,935,659 | 6/1990 | Naka et al. | 310/323 X |
| 4,937,488 | 6/1990 | Fujie et al. | 310/323 |
| 4,959,579 | 9/1990 | Kuwabara et al. | 310/323 |
| 4,980,599 | 12/1990 | Kuwabara et al. | 310/323 X |

FOREIGN PATENT DOCUMENTS

| | | | |
|---|---|---|---|
| 0247768 | 10/1987 | Japan | 310/323 |
| 63-73887 | 4/1988 | Japan . | |
| 0209485 | 8/1988 | Japan | 310/323 |
| 63-64581 | 9/1988 | Japan . | |
| 0026376 | 1/1989 | Japan | 310/323 |
| 0097180 | 4/1989 | Japan | 310/323 |

*Primary Examiner*—Mark O. Budd
*Attorney, Agent, or Firm*—Reinhart, Boerner, Van Deuren, Norris & Rieselbach

[57] ABSTRACT

An ultrasonic motor is disclosed. A rotor is pressed into contact with a stator disposed within a housing for rotation in accordance with the electrostrictive deformation of the stator. A screw shaft integrally rotates with the rotor, to convert the rotation of the rotor into the linear movement of an external body. A radial bearing holds the screw shaft to the case in a rotatable manner about its axis. The radial bearing including an inner ring secured to the screw shaft and an outer ring secured to the case for transferring a thrust load from the screw shaft to the case.

3 Claims, 3 Drawing Sheets

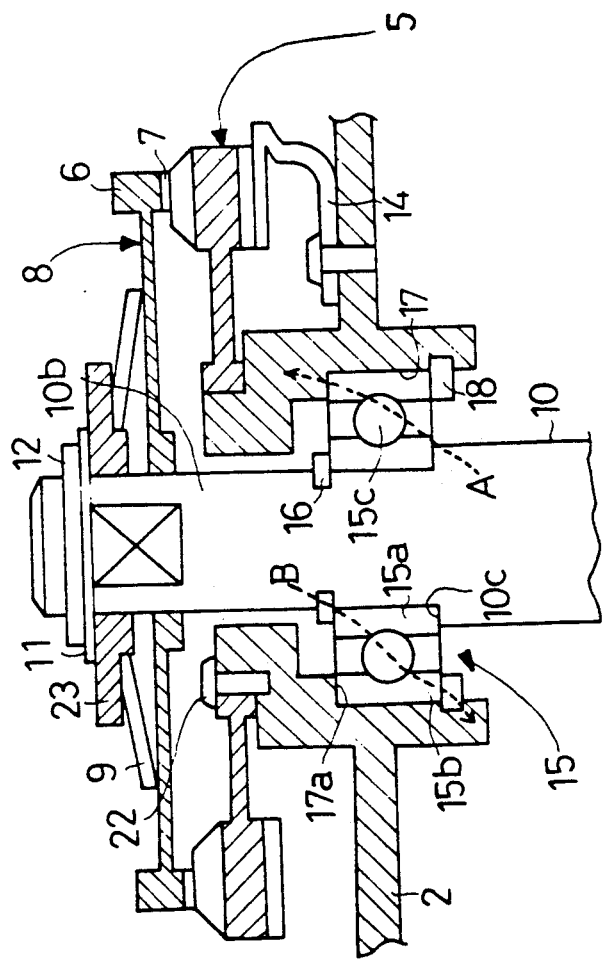

ULTRASONIC MOTOR

This application claims the priority of Japanese Patent Application No. 2-135554 filed on May 25, 1990, which is incorporated herein by reference.

BACKGROUND OF THE INVENTION

1. Field of the Invention

This invention generally relates to an ultrasonic motor. More particularly, the invention relates to an ultrasonic motor which is used as an actuator.

2. Description of the Related Art

Ultrasonic motors have a simplified structures when compared to the electric motor. Most notably, it eliminates the need for magnets and windings. In general, ultrasonic motors have high torque capabilities even at low rotational velocity. This is due to the ultrasonic vibration actuating system used to drive such motors. Furthermore, high accuracy can be attained in rotational control by designing the system to have friction transmitted between the stator and rotor during operation. These superior features of the ultrasonic motor have lead to their increasing popularity in a wide variety of applications.

One known construction of an ultrasonic motor incorporates a threaded drive shaft. This construction is known for its ability to provide a strong torque. As illustrated in FIG. 3, such a motor may include an annular stator 53 secured to an upper side of a bottom cover plate 52 of a housing 51. A rotor 57 is pressed against the stator 53 by a bevel spring 55 firmly mounted to an upper end of a drive shaft 54 in order to apply a predetermined pressure to the rotor 57.

The stator 53 carries an annular piezo electric element 56. A high frequency voltage is applied to the piezo electric element to cause a circumferentially continuous deformation. Thus, vibrations are generated on a surface of the stator 53 to rotate the rotor 57 without generating any audible sounds. The rotor 57 transmits its rotational movement to the shaft 54 through spring 55.

The shaft 54 is fixed to the rotor 57 at its upper end for integral rotation therewith. A nut 58 is mounted on the shaft 54 and has splined shafts 59 projecting into key ways 60 vertically extending on an inner wall of a case 62. Therefore, the nut 58 engages in the vertically linear movement on the shaft 54 along the key ways 60 in accordance with the rotation of the shaft 54.

As shown in FIG. 4, each spline shaft 59 is detachably connected to a bifurcated tip of a crank shaft 61 of an external body. This arrangement transmits the linear movement of the nut 58 to the external body by way of the crank shaft 61.

In the ultrasonic motor above mentioned, the rotating drive shaft 54 is subject to a thrust load from the nut 58 moving vertically. The thrust road forces the shaft 54 to displace over approximately 500 μm. This results in the change of pressing power of the rotor 55 against stator 53, causing generation of audible sound which is an unacceptable problem in many ultrasonic motor applications.

One proposed solution to the above problem, is to provide a thrust bearing between the housing and the drive shaft. The thrust bearing then receives the thrust load from the shaft. In this motor, however, the thrust bearing must be taken apart anytime the housing is removed from the motor. Therefore, the bearing must be re-assembled whenever the housing is remounted on the motor. This makes the maintenance of the motor very troublesome.

Furthermore, to insure that the thrust bearing works effectively, the housing 51 must be firm and the cover plate 52 must be relatively thick. This adds both weight and size to the ultrasonic motor, which are disadvantageous. It also makes it impractical to manually assemble the motor.

An alternative known ultrasonic motor structure utilizes a drive shaft which carries a gear or the like to transmit power from the rotor to the external body. However, this structure is also susceptible to generating audible sound due to displacement of the drive shaft which is subject to thrust loads caused by general defects in the motor.

The ultrasonic motor disclosed in the Japanese Unexamined Patent Publication 63-73887 seeks to overcome these shortcomings by mounting a radial bearing between the cover plate and the drive shaft. The radial bearing transmits the thrust load from the drive shaft to the cover plate. This motor, however, is not able to convert rotary movement of the drive shaft to the linear movement of the external body. Therefore, there is a need to install a device with a complicated structure for converting the rotational movement of the drive shaft into the linear movement of the external body.

SUMMARY OF THE INVENTION

Accordingly, it is a primary object of the present invention to provide an ultrasonic motor which can convert the rotational movement of a drive shaft into a linear movement of a driven body with a simple structure and which can maintain a constant pressing load between its stator and rotor to provide easy maintenance.

It is another object of the present invention to provide a small and light weigh ultrasonic motor that may be easily assembled.

To achieve the foregoing and other objects and in accordance with the purpose of the present invention, an ultrasonic motor is provided that has a rotor and a stator disposed within a housing. The rotor is pressed into contact with the stator to rotate in accordance with the electrostrictive deformation of the stator. A screw shaft rotatable integrally with the rotor is provided to convert the rotation of the rotor into linear movement of an external body. A radial bearing for rotatably mounting the screw shaft to the case is also provided. The radial bearing includes an inner ring secured to the screw shaft and an outer ring secured to the case. The bearing rings are immovable in the axial direction and are arranged to transfer a thrust load from the screw shaft to the case.

In a preferred embodiment, a nut is mounted to the screw shaft to transmit linear movement to external body. Furthermore, the screw shaft can extend into a cylindrical body attached to the case. The cylindrical body has a key way on its inner wall that receives a spline projection formed with the nut to guide the linear movement of the nut.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings in which:

FIG. 2 is a cross-sectional view partially omitting some components of FIG. 1;

DETAILED DESCRIPTION OF THE PREFERRED EMBODIMENT

Figure 1:
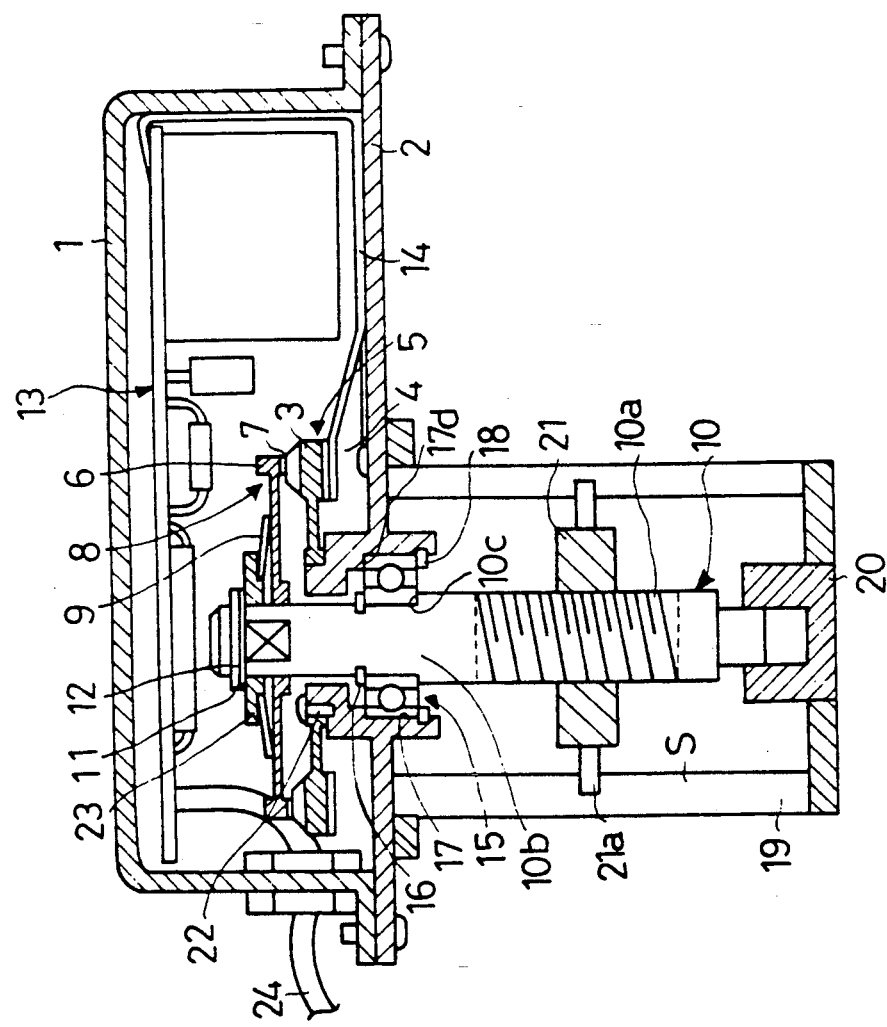
FIG. 1 is a cross-sectional view illustrating an ultrasonic motor according to the present invention.
Figure 4:
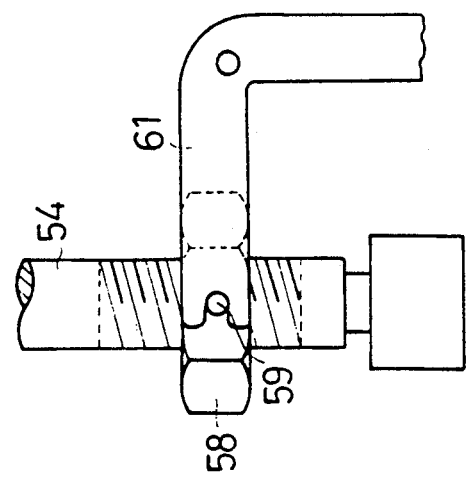
FIG. 4 is a schematic side view illustrating a power transmitting device in the conventional ultrasonic motor.
Figure 3:
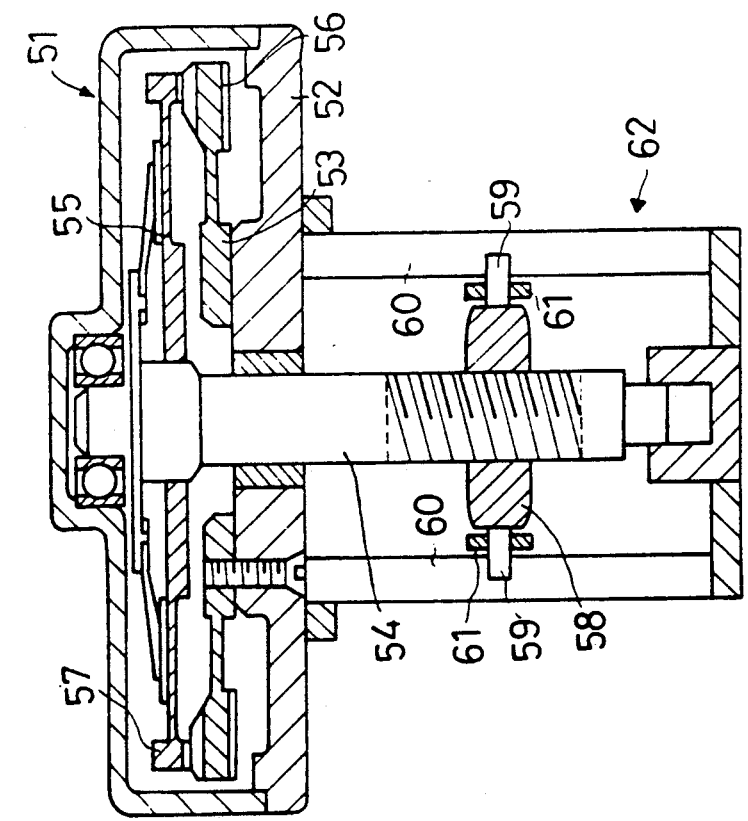
FIG. 3 is a cross-sectional view illustrating a conventional ultrasonic motor.

The preferred embodiment of the present invention is hereinafter described with reference to FIGS. 1 and 2.

The motor is encased by a housing 1 having a bottom opening and a cover plate 2 that seals the opening of the housing 1. The housing serves to both protect and electromagnetically shield the ultrasonic motor. The motor itself is secured to an inner surface of the cover plate 2. The motor includes a stator 5 and a rotor 8 disposed in the housing 1. The stator includes an annular elastomeric member 3 that carries an annular piezo electric element 4. The piezo electric element 4 deforms in accordance with an applied EMF to thereby generating and transmitting an elliptical vibration or continuously progressing wave to the member 3.

The rotor 8 includes a flexible ring 6 that carries a slider 7. The rotor 8 is pressed against the stator 5 with a predetermined pressure value by a bevel spring 9 supported at an end of drive shaft 10 via a spring support 23. This prevents the rotor from generating audible rotating sounds.

The progressing wave generated by the stator 5 causes the rotor 8 to rotate integrally with the drive shaft 10 without generating any audible sounds. The pressure applied to the rotor 8 is adjusted by selecting a washer 11 having the proper thickness. The washer is held at an upper end of the shaft 10 by a snap ring 12. The drive shaft 10 has a threaded portion 10a on its shank. The shank is received within a cylinder C fixed to an outer surface of plate 2.

A nut having a pair of spline shafts 21a threadably engages the threaded shank 10a. The spline shafts extend from opposite sides of the nut. A pair of key ways S extend vertically along the inner walls of the cylinder C to receive the spline shafts 21. Each shaft 21 projects into an associated key way S to guide the vertical linear movement of the nut 21, when the drive shaft 10 is rotated.

The housing 1 also accommodates a drive circuit 13 connected to an electric source by way of a wire 24. The drive circuit 13 outputs drive signals to the piezo electric element 4 through a flexible wire 14. As the flexible wire 14, flexible printed circuit wire made of a synthetic resin strip with a conductive material embedded therein is used. The conductive material is pressed by the flexibility of the wire 14 against an electrode of the piezo electric element 4 and is secured thereto by means of the conductive adhesive.

The shank of drive shaft 10 also has an unthreaded small diameter portion 10b for holding a radial bearing 15. The radial bearing receives radial loads and thrust loads acting on the drive shaft 10.

As illustrated in FIG. 2, the radial bearing 15 has an inner ring 15a and an outer ring 15b. A snap ring 16 presses against the upper surface of the inner ring 15a to hold the inner ring against a step 10c in the shaft so as to prevent the inner ring from moving in the axial direction. It is to be noted that the small diameter portion 10b can be omitted and the shaft 10 can be formed to have an equal diameter over its entire length. In this case, the radial bearing 15 has an inner diameter equal to the outer diameter of the shaft 10. In place of the step 10c, a snap ring can be attached to the shaft 10 to receive the thrust load A.

The plate 2 has a center hole 17 with a step 17a on its inner wall. A snap ring 18 is secured to the inner wall of the hole 17 to hold the outer ring 15b against the step 17a to prevent axial movement. The lower end of drive shaft 10 is supported by a bearing 20 held by a bottom portion of the cylinder 19.

The stator 5 is secured to the plate 2 by rivets 22. These rivets 22 can be eliminated by caulking the stator to a flange formed on the periphery of the plate 2.

It is to be noted that the ultrasonic motor illustrated in FIG. 2 has a flexible wire 14 modified from that of FIG. 1.

The ultrasonic motor is operated as follows.

When rotation of the rotor 8 and the drive shaft 10 cause the nut 21 to move upwardly, the drive shaft 10 is subject to the thrust load A which would tend to lift the rotor 8 away from the stator 5. This thrust load A is transmitted to the inner ring 15a through the step 10c and is then received by the snap ring 16. The thrust load A is, therefore, transferred to the outer ring 15b from the inner ring 15e via the ball 15c and relieved to the step 17a. In the other words, as shown by the dotted arrow, the thrust load A is transferred to the plate 2 from the drive shaft 10 via the radial bearing 15.

As mentioned above, the use of the snap ring provides with the same effects for receiving the thrust load A, when the drive shaft 10 has the same diameter over its entire length. Furthermore, the step 17a can be replaced by a snap ring which is also able to receive the thrust load A.

Reverse rotation of the rotor 8 lowers the nut 21 on the drive shaft 10. Thus, the drive shaft 10 is subject to the thrust load B which would bias the rotor 8 in the direction of stator 5. In this case, this thrust load B is transmitted to the step 10c from the snap ring 16 through the inner ring 15a. Therefore, the thrust load B acting on the drive shaft 10 is transmitted to the snap ring 18 attached to the plate 2 from the inner ring 15a through the ball 15c and the outer ring 15b of the radial bearing 15.

In summary, as shown by the dotted arrow, the thrust load B is transferred to the snap ring 18 of the plate 2 from the drive shaft 10 via the snap ring 16 and the radial bearing 15. Thus, the thrust loads A and B do not displace the shaft 10. Accordingly, they do not affect the pressure applied to the rotor 8 for contacting the stator 5 and therefore audible sounds are not generated.

To adjust the pressing load of the rotor 8 against the stator 5, housing 1 is removed from the plate 2 and the washer 11 is taken off from the drive shaft 10 and replaced with a new one having a different thickness. Thus, this adjusting operation can be readily carried out.

Since the housing 1 has no contact with the radial bearing 15, the housing does not receive thrust load A. This structure allows the housing 1 to be thin or to be made of a synthetic resin coated by a metal. This allows minimization of the weight of the housing 1.

In this embodiment, the housing 1 is thin to provide a wide inner space that enables the housing to accommodate the drive circuit 13. This results in shortening the flexible wire 14 connecting the drive circuit 13 and piezo electric element 4.

Further, the electromagnetic shield can be provided by the housing 1 and the plate 2 themselves, thereby avoiding the use of a shield wire and a connecter which cause the electric noise.

Moreover, there is no need to make a specific chamber to accommodate the drive circuit 13, which effectively reduces the manufacturing expense.

In this embodiment, the ultrasonic motor is assembled as described below which is particularly suitable for mass production.

First, the small diameter portion 10b of the drive shaft 10 is forcibly inserted into the radial bearing 15 until the lower portion of the inner ring 15a abuts against the step 10c. Then, the snap ring 16 is mounted on the small diameter portion 10b to form a shaft-sub-assembly which secures the radial bearing to the drive shaft 10.

The sub-assembly is then inserted into the stepped hole 17 of the plate 2 until an upper portion of the outer ring 15b abuts against the step 17a. Then, the snap ring 18 is mounted within the hole 17 to secure the bearing 15 to the plate 2.

The stator 5 is fixed to the plate 2 by the rivets 22. Subsequently, the rotor 8, the belleville spring 9, the spring pressor 23 and the washer 11 are serially mounted on the shaft 10, and are secured to the shaft 10 by means of snap ring 12. Afterwards, the flexible wire 14 and cord 24 are connected to the drive circuit 13. This drive circuit 13 is attached to the housing 1 which is then secured to the plate 2.

As described above, the ultrasonic motor in the embodiment is assembled easily which provides a manufacturing process suitable for mass production.

Additionally, the flexible wire 14 is pressed by its own flexibility against the piezo electric element 4 and secured by the conductive adhesive thereto. This assures the long life of the electrode unlike the conventional art which use solder to attaching the wire to the piezo electric element. The solder tends to lose its adhesiveness and consequently, its conductivity in time.

It is to be noted that the present embodiment is to be considered as illustrative and not restrictive and the invention is not to be limited to the details given herein, but may be modified within the scope of the appended claims.

What is claimed is:

1. An ultrasonic motor comprising:
    a stator disposed within a housing;
    a rotor pressed into contact with the stator for rotation in accordance with the electrostrictive deformation of the stator;
    a threaded screw shaft rotatable integrally with the rotor, for converting rotation of the rotor into linear movement of an external body;
    a radial bearing for rotatably mounting the screw shaft to the case, the radial bearing including an inner ring secured to the screw shaft and an outer ring secured to the case, the bearing rings being immovable in the axial direction;
    a nut mounted to the screw shaft to convert rotational movement of the shaft to linear movement;
    a cylindrical body attached to the housing and into which the screw shaft extends; and
    a linear keyway formed on an inner wall of said body for receiving a spline projection carried by the nut to guide the linear movement of the nut.

2. An ultrasonic motor comprising:
    a stator including a piezoelectric element and an elastomeric member secured to the piezoelectric element, the elastomeric member being arranged to be deformed in accordance with continuous electrostrictive deformation of the piezoelectric element;
    a rotor including a flexible ring and a slider carried by the flexible ring;
    a belleville spring for pressing the slider against the elastomeric member with a predetermined pressure;
    a threaded screw shaft integrally rotatable with the rotor;
    a nut mounted to the screw shaft for transmitting rotational movement of the shaft into linear movement of an external body;
    a housing for encasing the rotor and the stator;
    a radial bearing for transferring a thrust load from the screw shaft to the housing;
    a cylindrical body attached to the housing and into which the screw shaft extends; and
    a linear keyway formed on an inner wall of said body for receiving a spline projection carried by the nut to guide the linear movement of the nut.

3. An ultrasonic motor comprising:
    a stator including a piezoelectric element and an elastomeric member secured to the piezoelectric element, the elastomeric member being arranged to be deformed in accordance with continuous electrostrictive deformation of the piezoelectric element;
    a rotor including a flexible ring and a slider carried by the flexible ring;
    a belleville spring for pressing the slider against the elastomeric member with a predetermined pressure;
    a threaded screw shaft integrally rotatable with the rotor;
    a nut mounted to the screw shaft for transmitting rotational movement of the shaft into linear movement of an external body;
    a housing for encasing the rotor and the stator;
    a radial bearing for transferring a thrust load from the screw shaft to the housing;
    a cylindrical body attached to the housing and into which the screw shaft extends;
    a linear keyway formed on an inner wall of said body for receiving a spline protection carried by the nut to guide the linear movement of the nut; and
    a drive circuit disposed within said housing, the drive circuit being connected to the piezoelectric element by a flexible wire, the flexible wire having a conductive portion pressed by the elasticity of the wire into engagement with an electrode of the piezoelectric element and secured thereto by a conductive adhesive.

* * * * *